2,913,470
ORGANIC COMPLEXES OF MERCURY

Samuel Allen Heininger, Dayton, Ohio, assignor to Monsanto Chemical Company, St. Louis, Mo., a corporation of Delaware No Drawing. Application December 26, 1957
Serial No. 705,107

7 Claims. (Cl. 260—433)

The present invention relates to mercury-containing organic complexes and more particularly to complexes of mercury and certain amino nitriles.

According to the invention, there are provided new and valuable complexes of the formula

in which R is a benzenoid radical of from 6 to 12 carbon atoms. I have found that said complexes are readily prepared by the reaction of an appropriate benzenoid amine, i.e., a compound of the formula $RNH_2$ in which R is as defined above, with acrylonitrile in the presence of a mercuric salt of an organic or inorganic acid.

Benzenoid amines which are suitable for the preparation of the present mercury complexes include the hydrocarbon amines such as aniline, the ar-alkylanilines such as 2-, 3- or 4-toluidine, 2-, 3-, 2,4-, 2,6-, 3,4- or 3,5-xylidene cumidine 2- 3- or 4-ethyl or tert-butylaniline, benzylamine, α-methylbenzylamine, 2,3- or 4-isopropylbenzylamine, α- or β-naphthylamine, 2-, 3- or 4-biphenylamine, 2-amyl-4-biphenylamine, phenethylamine, etc. The aromatic ring of the benzenoid amine may be substituted by one or more non-hydrocarbon radical, e.g., by the cyano, nitro, hydroxy, mercapto, thiol, alkoxy, and sulfo radicals or by chlorine and bromine. Thus there are provided complexes of one atom of mercury with the reaction product of two moles of acrylonitrile with two moles of benzenoid amines such as 2-, 3- or 4-chloroaniline, 2,3 or 3,5-dichloroaniline, 2-, 3- or 4-anisidine, 2-, 3- or 4-aminobenzonitrile, 2-, 3- or 4-aminophenol, 2-, 3- or 4-nitroaniline, 2,3-dichloro-4,6-dinitroaniline, 2-tert-butyl-4-nitroaniline, β-chloro-α-naphthylamine, 4'-propoxy-4-biphenylamine, 2-, 3- or 4-aminobenzenethiol, etc.

While I do not know the mechanism by which the present benzenoid amine-mercury complexes are formed, it is probable that the reaction proceeds through primary formation of a β-(arylamino)-propionitrile:

and subsequent addition of two moles of the amino nitrile to a mercury ion which originates from the mercuric salt in the presence of which the reaction is effected.

Mercuric salts employed for the preparation of the present complexes are, e.g., salts of organic acids such as mercuric acetate, propionate, butyrate, benzoate, α-naphthoate, p-toluenesulfonate; or of inorganic acids such as mercuric sulfate, nitrate, phosphate, etc. For ease in manipulation and good yield of the complex product the mercury salts of paraffinic monocarboxylic acids having from 2 to 5 carbon atoms are preferred.

Reaction of the benzenoid amine, acrylonitrile and mercury salt takes place readily by allowing a mixture of the three constituents to stand at ordinary or increased temperatures until formation of the complex has taken place. Heating at a temperature of from, say, 50° C. to the refluxing temperature of the reaction mixture is recommended. The benzenoid amine and acrylonitrile are advantageously present in substantially equimolar proportions with respect to each other; however, an excess of either the amine or the acrylonitrile may be employed, since either material, when present in excess, may be recovered from the resulting reaction product. The mercuric salt is advantageously present in minor proportion with respect to the other reactants. The excess of amine and possibly of the acrylonitrile thus provides for the presence of a basic material which unites with the other ion of the mercury salt. If desired, however, the mercuric salt, also, may be present in the stoichiometric proportion, i.e., one mole of mercury salt per two moles each of the amine and nitrile, and the reaction effected in the presence of an extraneous basic material or hydrogen donor which is unreactive with either the amine or the acrylonitrile, e.g., a tertiary amine or alcohol. Also, although the present condensation proceeds readily in the absence of an extraneous solvent, in some instances, particularly when working with the higher molecular amines, an inert solvent or diluent may be employed.

The presently provided complexes are stable, well-defined products which are generally crystalline solids. While they may be advantageously employed for a variety of commercial and agricultural purposes, they are particularly valuable as biological toxicants. Thus the complex $Hg(C_6H_5NHCH_2CH_2CN)_2$, i.e., the complex of a mercury II ion with two moles of 3-anilinopropionitrile has been found to inhibit the growth of M. pyogenes var. aureus at a concentration of 0.00001 gm./ml. and to possess selective preemergent herbicide effect in that at a concentration of 25 lbs./acre it completely inhibits the germination of cheat grass and fox tail while not at all affecting germination of crop seeds such as radish, sugar beet and cotton. The present complexes also show promise as peptizers, stabilizers and antidegradants in rubber technology.

The invention is further illustrated, but not limited, by the following example:

Example

To a 500 ml. flask, there were charged 186 g. (2.0 moles) of aniline, 106 g. (2.0 moles) of acrylonitrile, and 10.2 g. (5.5% by weight of the aniline) of mercuric acetate. The resulting mixture was stirred and heated rapidly to reflux (98° C.), and refluxing was continued for 2 hours and 45 minutes, at which point the temperature of the reaction mixture was 100° C., and 5 additional grams of the mercuric acetate was added. Refluxing was continued for another 15 minutes and the reaction mixture was then allowed to stand at room temperature for several days. The crystalline solid which separated out was filtered and dried to give 26.2 g. of the crude complex of one atom of mercury with two moles of 3-anilinopropionitrile, M.P. 205° C. It was insoluble in water, ether and ethanol, and somewhat soluble in acetone and carbon tetrachloride. Upon washing th crude complex with ether and filtering, there was obtained 20.5 g. of the purer complex, M.P. 208–210° C. Distillation of the combined filtrates gave 81 g. (77%) of acrylonitrile, 151 g. (81%) aniline and 33 g. (11.3%) of a dark viscous fluid as residue. This was dissolved in ethanol, decolorized with charcoal, filtered and cooled to give another 1.2 g. of the complex. There was thus obtained a total of 21.7 g. of the complex, amounting to a 92.5% of the theoretical yield.

Analysis of the presently obtained complex gave the following values:

|  | Found | Calcd. for $C_{18}H_{20}N_4Hg$ |
|---|---|---|
| Percent C | 43.17 | 43.9 |
| Percent H | 4.05 | 4.1 |
| Percent N | 11.77 | 11.4 |
| Percent Hg | 41.0 (by difference) | 40.6 |

Operating as in the above example, 2-toluidine or 4-chloroaniline reacts with acrylonitrile and mercuric acetate or mercuric sulfate to give the complex $Hg(CH_3C_6H_4NHCH_2CN)_2$ or the complex $$Hg(ClC_6H_4NHCH_2CH_2CN)_2$$

Other modes of applying the principle of my invention may be employed instead of those described in the example, change being made as regards the temperature, time and proportion of reactants employed. Also, if desired, instead of using only one benzenoid amine in the reaction mixture, there may be prepared mixed complexes by employing with two moles of the acrylonitrile, one mole of one benzenoid amine and one mole of another benzenoid amine. There are thus obtained complexes of the formula

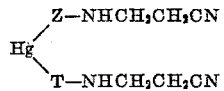

wherein Z and T signify different benzenoid radicals.

As will be apparent to those skilled in the art, many variations of the process and complex products herein described may be made, the present invention being limited only by the appended claims.

What I claim is:

1. An organic mercury-containing complex compound of the formula $$Hg(R—NHCH_2CH_2CN)_2$$

in which R is an aromatic radical of from 6 to 12 carbon atoms.

2. An organic mercury-containing complex compound of the formula $$Hg(Ar—NHCH_2CH_2CN)_2$$

in which Ar denotes an aryl radical of from 6 to 12 carbon atoms.

3. An organic mercury-containing complex compound of the formula

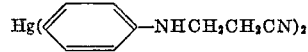

4. The method which comprises mixing together an aromatic amine of from 6 to 12 carbon atoms, acrylonitrile and a mercuric salt and recovering from the resulting reaction product an organic mercury-containing complex compound of the formula $$Hg(R—NHCH_2CH_2CN)_2$$

in which R is an aromatic radical of from 6 to 12 carbon atoms.

5. The method which comprises heating together an aryl amine of from 6 to 12 carbon atoms, acrylonitrile and a mercuric salt and recovering from the resulting reaction product an organic mercury-containing complex compound of the formula $$Hg(R—NHCH_2CH_2CN)_2$$

in which R is an aryl radical of from 6 to 12 carbon atoms.

6. The method which comprises heating an aryl amine of from 6 to 12 carbon atoms with acrylonitrile in the presence of a minor proportion, based on the weight of the amine and the acrylonitrile, of a mercuric salt of paraffinic monocarboxylic acid of from 2 to 5 carbon atoms, and recovering from the resulting reaction product an organic mercury-containing complex compound of the formula $$Hg(Ar—NHCH_2CH_2CN)_2$$

in which Ar denotes an aryl radical of from 6 to 12 carbon atoms.

7. The method which comprises refluxing aniline with acrylonitrile in the presence of a minor proportion, based on the weight of the aniline and the acrylonitrile, of mercuric acetate, and recovering from the resulting reaction product an organic mercury-containing complex compound of the formula

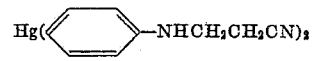

References Cited in the file of this patent

UNITED STATES PATENTS

| 1,949,485 | Migrdichian et al. | Mar. 6, 1934 |
| 2,155,922 | Anderson | Apr. 25, 1939 |

UNITED STATES PATENT OFFICE
CERTIFICATE OF CORRECTION

Patent No. 2,913,470            November 17, 1959

Samuel Allen Heininger

It is hereby certified that error appears in the above numbered patent requiring correction and that the said Letters Patent should read as corrected below.

Column 3, line 14, the formula should appear as shown below instead of as in the patent:

$$Hg(CH_3C_6H_4NHCH_2CH_2CN)_2$$

Signed and sealed this 7th day of November 1961.

(SEAL)
Attest:

ERNEST W. SWIDER            DAVID L. LADD
Attesting Officer            Commissioner of Patents